Nov. 7, 1950  J. H. BROADBENT  2,528,575
ALTITUDE RESPONSIVE CONTROL DEVICE
Filed Jan. 23, 1948
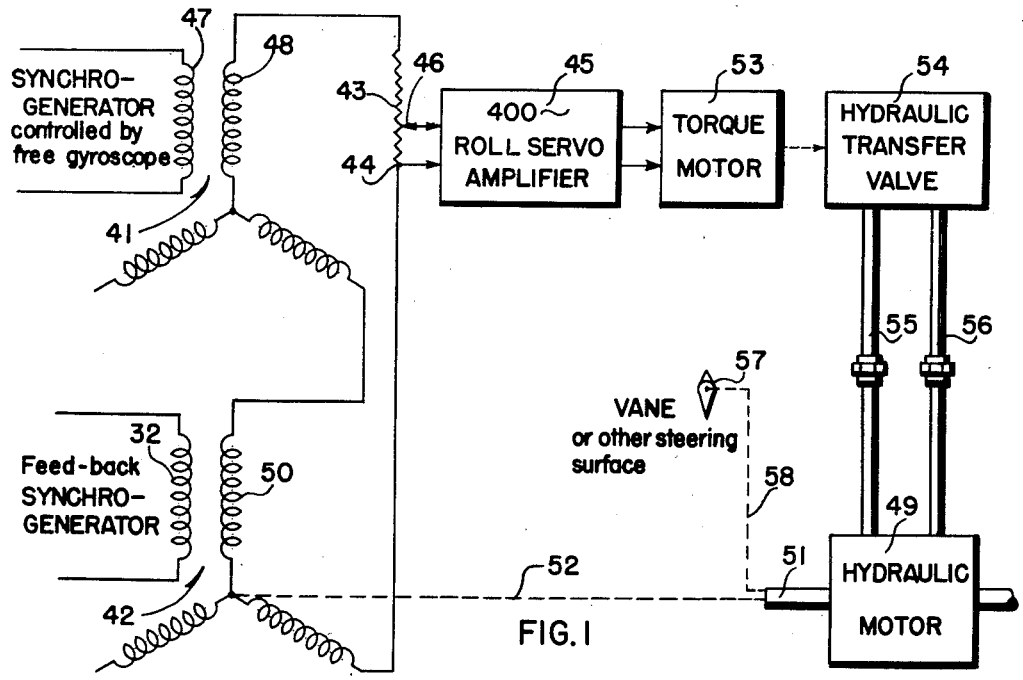
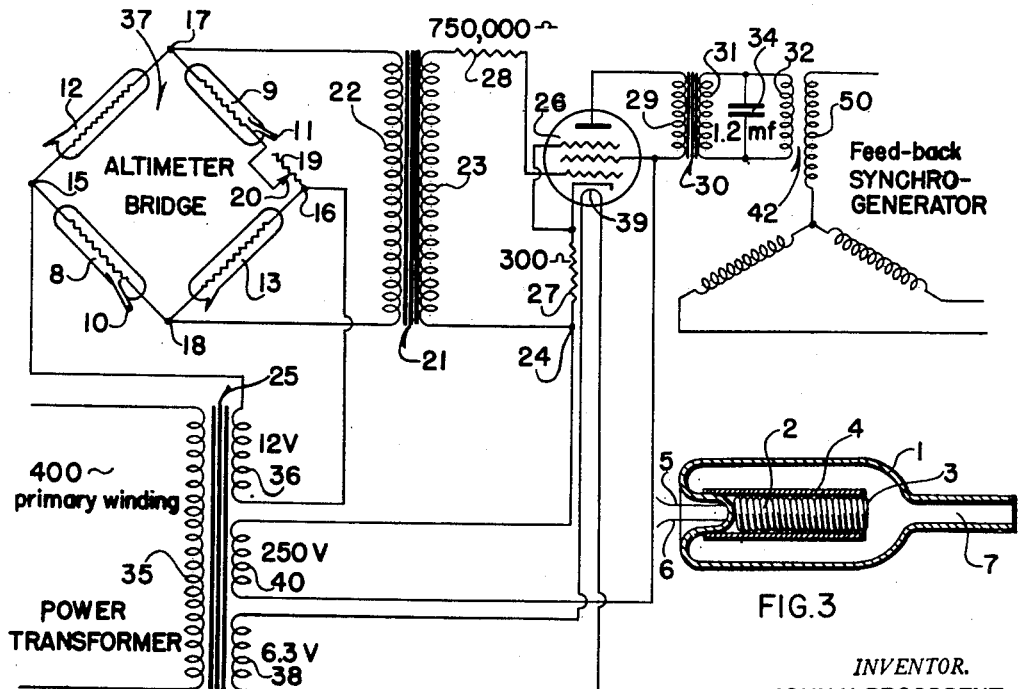
INVENTOR.
JOHN H. BROADBENT
BY
ATTORNEY Patented Nov. 7, 1950

2,528,575

UNITED STATES PATENT OFFICE 2,528,575

ALTITUDE RESPONSIVE CONTROL DEVICE

John H. Broadbent, Baltimore, Md., assignor to United States of America as represented by the Secretary of the Navy Application January 23, 1948, Serial No. 3,845

2 Claims. (Cl. 323—75)

The present invention relates to altitude responsive control devices.

More specifically, it relates to a process and means for controlling the steering surfaces of an air-borne vehicle by means of a new type of altitude-responsive device, that depends on the loss of heat of an electrically heated body by conduction to the surrounding atmosphere, the rate at which such loss takes place being a function of the composition and pressure of the said atmosphere.

An object of the invention, broadly, is to determine altitude from the rate at which heat is thus conducted away from the heated body, and to provide an electrical control means responsive thereto, which may be used to modify the setting of steering devices or other apparatus.

A further and more specific object is to provide an altitude-controlled means depending on a heat-emitting filament that is of small enough cross section to have a very rapid response and which is mounted in such way that other heat losses, such as those due to radiation and convection, will be reduced sufficiently to be negligible, so that substantially the entire heat loss is that due to conduction alone.

When air-borne guided missiles, for example, are operated at different altitudes above the earth, they encounter correspondingly different atmospheric pressures and densities. It is obvious that at the same relative velocity a less dense atmosphere will exert proportionally smaller forces against the steering surfaces of the vehicle, so that a given angular shift of any such surface will have less effect in correcting an error in the course of the vehicle than when the latter is traveling in a denser atmosphere; that is, the response will become more and more sluggish as the altitude increases.

It is therefore another important object of the present invention to provide means for varying the angle of attack of the steering surface to secure the same desired rate of response, the variation of said angle being determined by the density of the atmosphere in such way that the angle becomes greater as the altitude increases, in order to secure dynamically a proper restoring force. This object may be attained by providing an altitude-responsive device connected to the steering mechanism to control the latter in the proper sense to provide an increased angle of attack with increased altitude of the vehicle.

And still another object of the invention resides in the provision of a servo system including steering means for guided missiles which operate at high altitudes, in which an altimeter device of the above type is employed to vary the setting of the steering surface to compensate for variations of density of the atmosphere with altitude.

The invention will be understood after a reading of the present specification, which describes a form at present preferred, and from the accompanying drawings thereof, wherein:

Fig. 1 is a diagrammatic illustration showing the steering device and certain associated elements, partly as block diagrams and partly as electrical circuits;

Fig. 2 is a diagram showing the electrical circuits of the altimeter; and

Fig. 3 is a diagrammatic representation of one of the pressure-sensitive tubes, in axial section.

The general purpose of the invention is to compensate for the variation of atmospheric density with altitude, which has the result that the steering surface or surfaces of an aerial vehicle become progressively less effective as the altitude increases. This purpose is accomplished by providing a circuit containing one or more pressure-sensitive tubes, preferably two, connected in electrically opposite arms of a Wheatstone bridge, energizing said bridge with alternating electrical power (A. C.), and amplifying the output of said bridge sufficiently to enable it to control a motor that operates the steering means, the system being so designed that, for the same deviation from correct orientation, the steering means will be turned through progressively greater angles as the density of the atmosphere decreases.

In Fig. 1 there is shown a vehicle-carried system that comprises a pair of synchro-generators 41 and 42, with their output windings 48 and 50 connected in series, a suitable resistor 43 being interposed in said series circuit as shown. One terminal 44 of this resistor is connected directly to an input terminal of a servo amplifier 45, the other input terminal of said amplifier being connected to the contact 46 which is shiftable along the resistor 43 to apply a suitable input voltage to the amplifier.

The synchro generator 41 has its exciting winding 47 maintained at a suitable alternating voltage of constant amplitude, such as 110 volts, and one of the windings 47 and 48 is mechanically connected to be turned with respect to the other by a free gyroscope, not shown, to vary the coupling between said windings correspondingly, whereby the output voltage of synchro-generator 41 is thus a function of the orientation of the vehicle. The exciting winding 32 of the feed-back synchro-generator 42 is energized, on the contrary, not by a constant voltage but by the output of an amplifier 26, described hereinafter, which is controlled by the altimeter bridge 37, and has the relative turning of its windings performed by the hydraulic motor 49 through a suitable mechanical connection 52, instead of by the gyroscope. The output of the winding 50 therefore is a function of the altimeter bridge output, and of the position of the piston rod 51 of the hydraulic motor, jointly.

The purpose of the amplifier 45, whose circuits are not disclosed herein as they do not constitute part of the present invention, is to provide sufficient power, from the relatively small voltage drop along the resistor 43, to energize the torque motor 53 which likewise itself forms no part of the present invention, but may be any device, of polarized relay type, for example, of adequate power to shift the valve plunger of the hydraulic transfer valve 54 sufficiently in one direction or the other to cause a corresponding shift of the piston rod 51 of the hydraulic motor controlled by said valve, through the conduits 55 and 56.

At the same time that said piston rod turns the rotor of the synchro-generator 42 through the mechanical connection 52, it also turns the vane or other steering device 57, by means of the mechanical connection 58.

Referring next to Fig. 3, the sensitive element is shown as comprising an envelope 1 enclosing a resistance wire 2, preferably of very small diameter. This wire, which suitably may be a fine nickel filament .0004" in diameter, is supported within the envelope 1 by a helically grooved cylinder 3 of refractory insulating material, such as lava, the wire being wound in said groove. This cylinder may be enclosed in a tube 4 of similar material, fitting closely enough around cylinder 3 to limit the layer of air surrounding the wire to a thickness of the order of $\frac{1}{16}$". Lead-in conductors 5 and 6 constitute terminals for the wire 2, so that it may be connected into a circuit, as shown for instance in Fig. 2. The envelope 1 illustrated in Fig. 3 has an open ended tube 7 at one end, to afford communication between the interior of the envelope and the atmosphere surrounding the said envelope. Devices of this general type are known as "Pirani gages" and are well known as applied to the measurement of partial vacua. Obviously the resistance wire must be made of a material whose resistance varies with the temperature, preferably one whose temperature coefficient is relatively large, such as the nickel wire already mentioned.

However, as used for the present purpose, the ultimate object is not primarily to determine an air pressure, or the altitude corresponding thereto, but to control the amount of deflection of a steering element. For this purpose, four tubes may be arranged in a bridge circuit, as shown in Fig. 2. Here two of the tubes, 8 and 9, are shown with openings 10 and 11 to place their interiors in communication with the atmosphere, while the other two, 12 and 13, are shown completely sealed so that the gas contents thereof do not vary with external pressures.

A source 36 of alternating current is connected as an input to the terminals 15 and 16 of one diagonal of the altimeter bridge 37, while the terminals 17 and 18 of the other diagonal constitute the output terminals of the bridge.

A balancing resistor 19, having a shiftable contact 20 coacting therewith, may be inserted in one arm of the bridge, to make it possible to balance-out inequalities in the resistances of the bridge arms. The proper location and adjustment of this resistor 19 may, of course, be found only by trial, as the said inequalities depend at least partly on the accidental variations existing in the tubes as manufactured, and it therefore is impossible to predict in which arm of the bridge the resistor 19 should be placed.

As the output of such a bridge usually is too small to operate control devices directly, an amplifier may be used to increase the power available. A suitable amplifier is illustrated in Fig. 2. Here a transformer 21 has the input terminals of its primary winding 22 connected to the bridge output terminals 17 and 18, to receive the output voltages of the said bridge. The secondary winding 23 of the transformer has one terminal 24 connected to the cathode of a pentode 26 through a suitable resistor 27, shown purely by way of example as 300 ohms, while the other terminal of winding 23 is connected to the control grid of the said tube 26 through the, for instance, 750,000 ohm resistor 28. It will be understood that resistor 27 is the usual cathode resistor, which serves to bias the control grid.

The screen grid and the anode of the pentode 26 are supplied with alternating power of the same frequency as that which energizes the bridge already described, and while perhaps some effect would be obtained even if the control grid and the anode were opposite in phase, obviously the maximum amplification will result when the connections are such that the control grid becomes increasingly positive in unison with the anode.

The anode current traverses the primary winding 29 of a transformer 30. The secondary winding 31 thereof is connected to the input or exciting winding 32 of the feed-back synchro-generator 42, a capacitor 34, here indicated as 1.2 mfd, being shunted across said secondary winding, as shown. By decreasing the excitation voltage to said feed-back or follow-up synchro-generator, the follow-up ratio of the servo system is changed.

A transformer 25 supplies the power needed to operate the various circuits just discussed. As indicated, 400 cycle energy is preferred, for reasons of economy of weight and bulk of the equipment. This transformer has a primary winding 35 which is designed to operate at the available alternating voltage and frequency.

A 12 volt secondary winding 36 has its ends connected to the terminals 15 and 16 of the altimeter bridge 37, this voltage rating assuming of course, that each of the tubes 8, 9, 12 and 13 is designed to operate at six volts, which is a convenient value.

A 6.3 volt secondary winding 38 supplies energy at the customary standard heater voltage to the heater 39 of the pentode 26, and may, of course, also energize any other heaters and/or filaments of other thermionic tubes that may be used in the system.

The third secondary winding 40 is designed to deliver a relatively high voltage, for instance 250 volts, to energize the anode circuit of the pentode 26 and also to supply anode energy to any other alternating current-actuated tubes of the system.

In operation, the conditions are so adjusted that the currents flowing in the nickel filaments will maintain them at the comparatively low temperature of about 400° C. At this temperature level there is relatively little heat loss by radiation. The convection losses are made negligible by the tubular sleeves 4, which impede the circulation of the gas, and also limit the amounts of air or other gas in contact with the filaments to such small values that no important amount of heat can be lost by convection.

Thus the rate of heat loss is determined almost entirely by conduction. Since the conductivity of air for heat is a well-known function of the pressure of said air, decreasing with increasing attenuation of the air, it is clear that the amplifier output varies with said air pressure.

As a missile rises into thinner air, and thus encounters less dynamic resistance, it is clear that a greater angular shift of the steering surface will be required, to provide sufficient deflecting force to secure the same path curvature. The altitude-responsive amplifier output is therefore well adapted to provide a variable angular shift of the steering means, controlled by the altitude.

It may be noted that in place of the source of alternating power, a direct current source could be used, if no amplifier is to be included in the system. However, as direct current amplifiers are complicated and heavy, alternating current operation is much to be preferred whenever such amplification is needed, as is usually the case.

Having disclosed the invention by describing the preferred embodiment thereof, it will be understood that this disclosure is provided solely for illustrative purposes and is not in any way to be considered as a limitation of the invention, the scope of which is defined wholly in and by the following claims.

What is claimed is:

1. Altitude-responsive control means comprising a bridge circuit having a pressure-responsive tube in each arm thereof, each tube comprising a resistance element having a high temperature coefficient to permit pressure changes to cause said resistance to vary, and a source of alternating power in one diagonal of the bridge, the tubes in alternate arms being sealed whereby the resistance thereof is constant, the tubes in the remaining arms being open to the atmosphere whereby the resistance thereof varies with pressure and the terminals of the other diagonal providing an output which varies in accordance with the atmospheric pressure.

2. Altitude-responsive control means comprising a bridge circuit having a pressure-responsive tube in each arm thereof, and a variable resistance in one arm of the bridge for compensating for inequalities in characteristics of the individual arms, each tube comprising a resistance element having a high temperature coefficient to permit pressure changes to cause said resistance to vary, and a source of alternating power in one diagonal of the bridge, the tubes in alternate arms being sealed whereby the resistance thereof is constant, the tubes in the remaining arms being open to the atmosphere whereby the resistance thereof varies with pressure and the terminals of the other diagonal providing an output which varies in accordance with the atmospheric pressure.

JOHN H. BROADBENT.

REFERENCES CITED

The following references are of record in the file of this patent:

UNITED STATES PATENTS

| Number | Name | Date |
|---|---|---|
| 662,156 | Waring | Nov. 20, 1900 |
| 1,694,264 | Hull | Dec. 4, 1928 |
| 2,159,142 | Fischer | May 23, 1939 |
| 2,369,811 | Stuart | Feb. 20, 1945 |
| 2,387,795 | Isserstedt | Oct. 30, 1945 |
| 2,412,263 | Hartig | Dec. 10, 1946 |
| 2,440,283 | Levy | Apr. 27, 1948 |
| 2,450,930 | Baclawski | Oct. 12, 1948 |